US009141817B2

(12) United States Patent  
Osada (10) Patent No.: US 9,141,817 B2  
(45) Date of Patent: Sep. 22, 2015

(54) IMAGE PROCESSING APPARATUS, METHOD OF CONTROLLING THE SAME, AND STORAGE MEDIUM (75) Inventor: Mamoru Osada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 113 days.

(21) Appl. No.: 13/562,609

(22) Filed: Jul. 31, 2012

(65) Prior Publication Data

US 2013/0055376 A1 Feb. 28, 2013

(30) Foreign Application Priority Data

Aug. 26, 2011 (JP) ................................. 2011-185254

(51) Int. Cl.
*G06F 7/04* (2006.01)
*G06F 12/00* (2006.01)
*G06F 12/14* (2006.01)
*G06F 13/00* (2006.01)
*G06F 17/30* (2006.01)
*G11C 7/00* (2006.01)
*G06F 21/60* (2013.01)

(52) U.S. Cl.
CPC .................................... *G06F 21/608* (2013.01)

(58) Field of Classification Search
CPC .................................................. G06F 21/608
USPC .......................................................... 726/16
See application file for complete search history.

(56) References Cited

U.S. PATENT DOCUMENTS

| 8,322,609 | B2 | 12/2012 | Hashimoto |
| 8,368,718 | B2 | 2/2013 | Shimada |
| 8,528,815 | B2 | 9/2013 | Hashimoto |
| 2002/0141776 | A1* | 10/2002 | Hirakawa et al. ................ 399/81 |
| 2005/0204144 | A1* | 9/2005 | Mizutani ........................ 713/182 |
| 2007/0006324 | A1 | 1/2007 | Osada et al. |
| 2007/0206088 | A1* | 9/2007 | Mizunashi et al. ........ 348/14.01 |
| 2008/0163363 | A1 | 7/2008 | Mizutani |

(Continued)

FOREIGN PATENT DOCUMENTS

| CN | 1668004 A | 9/2005 |
| JP | 2001-072318 A | 3/2001 |

(Continued)

OTHER PUBLICATIONS

How Browsers Work: Behind the scenes of modern web browsers By Tali Garsiel & Paul Irish Published Aug. 5, 2011.*

(Continued)

*Primary Examiner* — Dede Zecher  
*Assistant Examiner* — Vadim Savenkov  
(74) *Attorney, Agent, or Firm* — Fitzpatrick, Cella, Harper & Scinto (57) ABSTRACT This invention provides an image processing apparatus capable of allowing a user to easily confirm the display contents of a bulletin board without reducing operability if the user should confirm a message by the bulletin board function in authentication processing; a method of controlling the same; and a program. To accomplish this, in the image processing apparatus, an authentication processing unit acquires message information from a storage unit. When the message information is acquired, an authentication screen to execute authentication processing is displayed on a display unit together with the message information. If no message information is acquired, the authentication screen to execute authentication processing is displayed on the display unit.

8 Claims, 8 Drawing Sheets

(56) References Cited

U.S. PATENT DOCUMENTS

| | | |
|---|---|---|
| 2009/0015857 A1* | 1/2009 | Tsurumi .................. 358/1.14 |
| 2009/0158422 A1* | 6/2009 | Tomiyasu et al. ............ 726/17 |
| 2010/0007921 A1 | 1/2010 | Shimada |
| 2010/0125810 A1 | 5/2010 | Misumi et al. |
| 2010/0127076 A1 | 5/2010 | Hashimoto |
| 2010/0245899 A1 | 9/2010 | Hirama |
| 2011/0234635 A1* | 9/2011 | Utsuki ...................... 345/647 |
| 2011/0276410 A1* | 11/2011 | Hjelm et al. ............. 705/14.66 |
| 2013/0061075 A1 | 3/2013 | Hashimoto |

FOREIGN PATENT DOCUMENTS

| | | |
|---|---|---|
| JP | 2002-237919 A | 8/2002 |
| JP | 4124930 B | 7/2008 |
| JP | 2010-021938 A | 1/2010 |
| JP | 2010-118972 A | 5/2010 |
| JP | 2010-128090 A | 6/2010 |
| JP | 2010-228419 A | 10/2010 |
| WO | 2010/082364 A1 | 7/2010 |

OTHER PUBLICATIONS

Jan. 7, 2015 Chinese Office Action in Chinese Patent Appln. No. 201210309984.2.

Jul. 3, 2015 Japanese Official Action in Japanese Patent Appln. No. 2011185254.

* cited by examiner

IMAGE PROCESSING APPARATUS, METHOD OF CONTROLLING THE SAME, AND STORAGE MEDIUM

BACKGROUND OF THE INVENTION

1. Field of the Invention

The present invention relates to an image processing apparatus having a user authentication function and a bulletin board function.

2. Description of the Related Art

An image processing apparatus described in Japanese Patent No. 4124930 supports a bulletin board function of displaying, on a display unit, message information received from outside of the apparatus. Using this function enables the display of a predetermined message on the operation screen and allows the user to be notified of, for example, the timing of maintenance of the image processing apparatus. Some image processing apparatuses support an authentication function of performing user authentication and display a waiting screen for user authentication.

However, the related art has problems, to be described below. In the related art, the bulletin board function and the authentication function are independent functions. When the user is caused to confirm a message by the bulletin board function at the timing of authentication processing, operability is reduced. For example, to display the authentication screen after the bulletin board has been closed, an operation to display the authentication screen before the authentication operation is necessary, resulting in reduced operability. When displaying the bulletin board after authentication processing, too, an operation corresponding to one screen is needed before the normal operation, and again operability is reduced.

User authentication includes, for example, IC card authentication that requires no operation via the display screen. When the user is caused to confirm a message by the bulletin board function at the timing of authentication using an IC card, a possibility for confirming the message on the bulletin board by the user is very low.

SUMMARY OF THE INVENTION

The present invention enables realization of an image processing apparatus capable of allowing a user to easily confirm the display contents of a bulletin board without reducing operability when the user confirms a message using the bulletin board function in authentication processing, a method of controlling the same, and a storage medium.

One aspect of the present invention provides an image processing apparatus comprising: a storage unit that stores message information received from an external apparatus; an authentication unit that executes an authentication processing of a user who uses the image processing apparatus; an acquisition unit that acquires the message information from the storage unit; and a display control unit that displays, on a display unit, an authentication screen to execute the authentication processing, wherein when the message information is acquired by the acquisition unit, the display control unit displays, on the display unit, the authentication screen to which the message information is added.

Another aspect of the present invention provides a method of controlling an image processing apparatus including a storage unit that stores message information received from an external apparatus, and an authentication unit that executes authentication processing of a user who uses the image processing apparatus, comprising: acquiring the message information from the storage unit; and displaying, on a display unit, an authentication screen to execute the authentication processing, wherein when the message information is acquired in the acquiring, the message information is added to the authentication screen in the displaying the authentication screen.

Still another aspect of the present invention provides a computer-readable storage medium storing a computer program that causes a computer to execute each step of a method of controlling the image processing apparatus.

Further features of the present invention will be apparent from the following description of exemplary embodiments with reference to the attached drawings.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

<First Embodiment>
<Arrangement of Information Processing System>

The first embodiment will now be described with reference to FIGS. 1 to 5. An example of the arrangement of an information processing system according to the embodiment of the present invention will be described first with reference to FIG. 1. Reference numeral 103 denotes a LAN (Local Area Network) 103. A PC 102 and an image processing apparatus 101 are connected so that they may communicate with each other. In this embodiment, the image processing apparatus 101 is connected to the PC 102 on the LAN 103, and a message of a bulletin board function is registered from the PC 102. An authentication function according to this embodiment manages authentication information in the device (image processing apparatus 101).

<Image Processing Apparatus>

Figure 1:
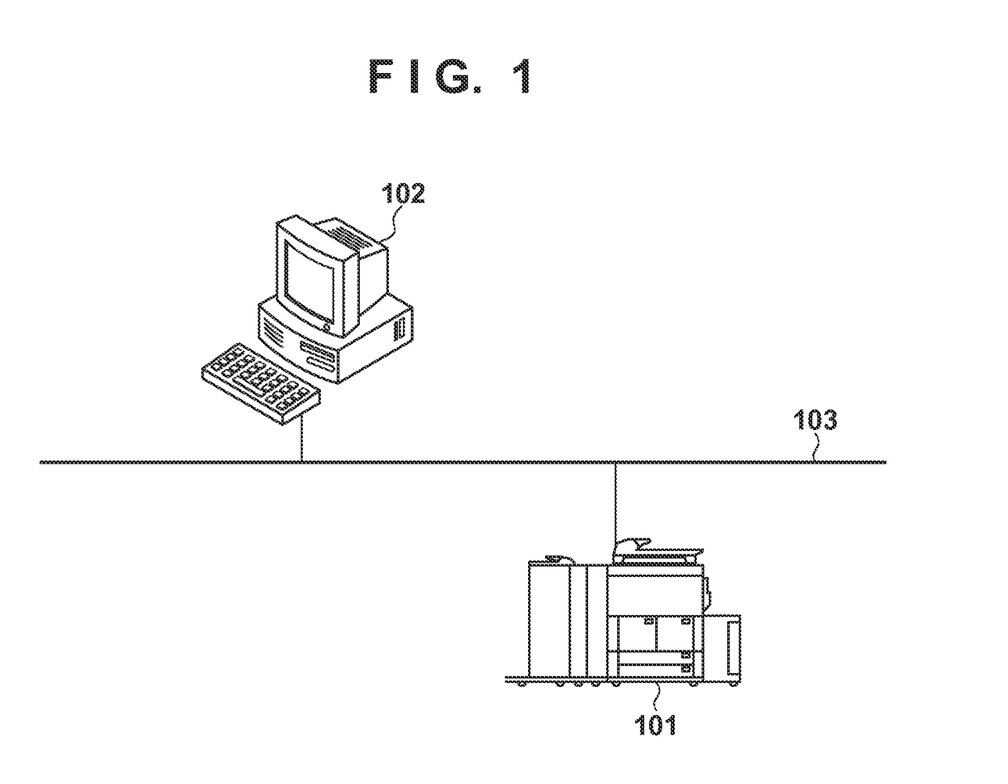
FIG. 1 is a view showing the overall arrangement of an information processing system according to the first embodiment.
Figure 2:
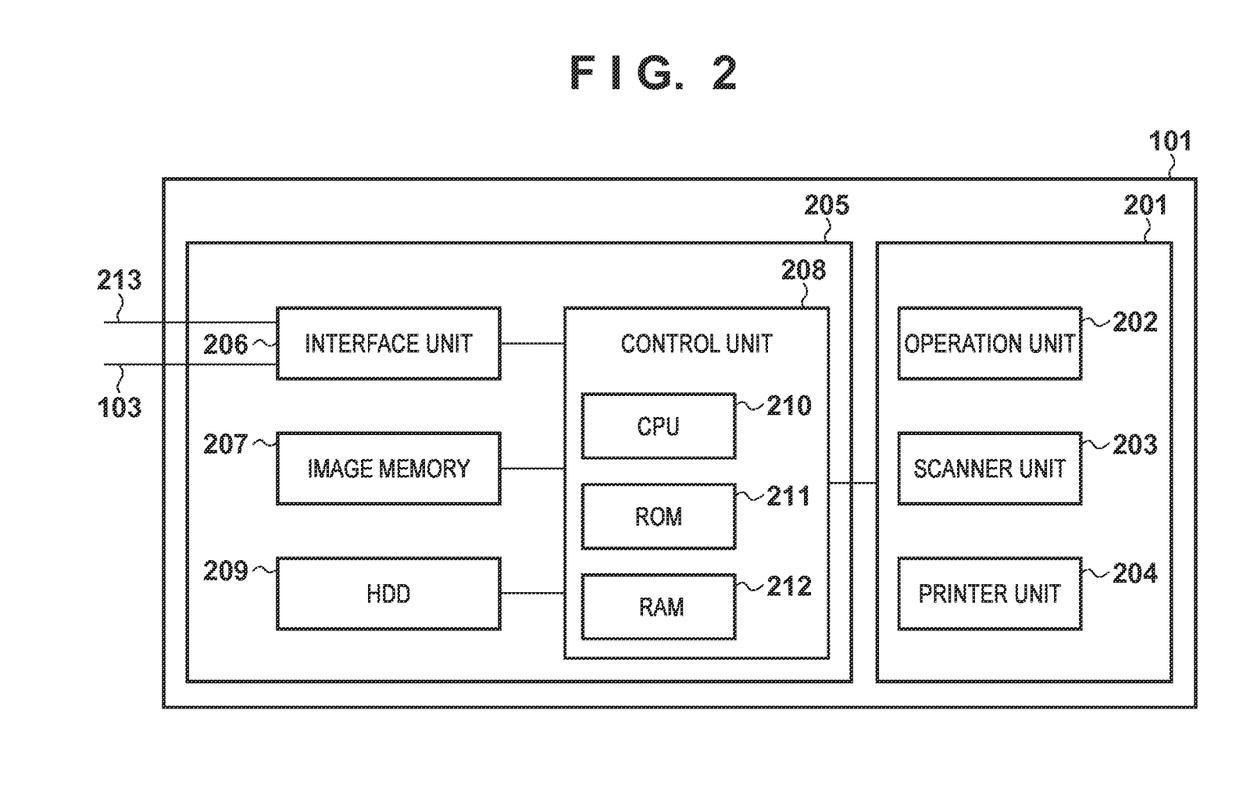
FIG. 2 is a block diagram showing the device configuration of an image processing apparatus according to the first embodiment.

The device configuration of the image processing apparatus 101 will be described next with reference to FIG. 2. The image processing apparatus 101 includes a function unit 201 and a system control unit 205. The function unit 201 includes an operation unit 202, a scanner unit 203, and a printer unit 204. The system control unit 205 includes an interface unit 206, an image memory 207, a control unit 208, and an HDD 209. The control unit 208 includes a CPU 210, a ROM 211, and a RAM 212.

The control unit 208 including the CPU 210 controls the operation of the entire image processing apparatus 101. The CPU 210 reads out control programs stored in the ROM 211 and executes various kinds of control processing, such as read control and send control. The RAM 212 is used as a temporary storage area such as the main memory or work area of the CPU 210. The HDD 209 stores image data and various kinds of programs.

The control unit 208 is connected to the function unit 201 to control the operations of the operation unit 202, the scanner unit 203, and the printer unit 204. The operation unit 202 includes, for example, a keyboard and a liquid crystal display unit which has a touch panel function to receive input via user operation. The printer unit 204 receives image data to be printed from the control unit 208 and prints it on a printing medium. The scanner unit 203 reads an image on an original to generate image data and inputs it to the control unit 208.

The interface unit 206 connects the control unit 208 to the LAN 103 to receive print image data from an information processing apparatus such as the PC 102 on the network or screen data to be displayed on the operation unit 202. The interface unit 206 also connects the control unit to an IC card reader or a memory stick via a USB I/F 213 to receive authentication information or image data. Note that the print image received from the information processing apparatus on the network is temporarily stored in the image memory 207 and printed by the printer unit 204 via the control unit 208.

<Software Configuration of Image Processing Apparatus>

Figure 3:
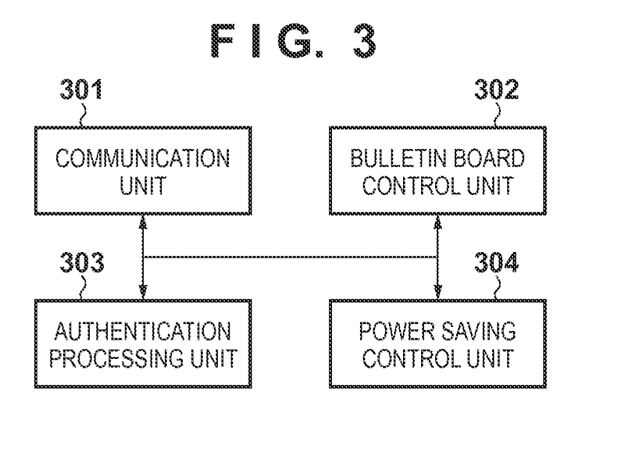
FIG. 3 is a block diagram showing the software configuration of the image processing apparatus according to the first embodiment.

Part of the software structure of the image processing apparatus 101 will be described next with reference to FIG. 3. The program that constitutes the software structure is stored in the HDD 209. The program is read out onto the RAM 212 and executed by the CPU 210.

The image processing apparatus 101 includes a communication unit 301, a bulletin board control unit 302, an authentication processing unit 303, and a power saving control unit 304 as part of the software configuration. The communication unit 301 controls communication with outside of the image processing apparatus 101 via the interface unit 206. In this embodiment, the communication unit 301 performs processing of transferring bulletin board message information sent from the PC 102 to the bulletin board control unit 302.

The bulletin board control unit 302 implements the bulletin board function of the image processing apparatus 101, and has a function of storing message information received from the communication unit 301 in a predetermined area of the HDD 209 and managing the message information. Note that a plurality of periodical contact messages may be registered as message information, and a day of week or time may be designated to switch the message automatically. The bulletin board control unit 302 also has a function of returning predetermined message information and a function of displaying the bulletin board in accordance with an access from the authentication processing unit 303. The authentication processing unit 303 provides a function of authenticating the user who operates the image processing apparatus 101. In this embodiment, the authentication processing unit 303 reads out the information of a user's card from the IC card reader connected via the USB I/F 213, and authenticates the user based on authentication information stored in the HDD 209 in advance. Note that the authentication information may be stored in a server or the like (not shown) on the network via the LAN 103 and used for authentication. The authentication method is not limited to this embodiment.

The power saving control unit 304 monitors the operation states of the operation unit 202, the scanner unit 203, and the printer unit 204, and controls the power saving state by turning off the panel (to be referred to as an operation panel hereinafter) of the operation unit 202 at a predetermined timing or controlling power supply to the scanner unit 203 and the printer unit 204. The power saving control unit 304 has a function of notifying the outside of the on state of the operation panel via a predetermined I/F, a function of turning on the operation panel based on an external instruction, and the like.

<Processing Procedure>

Figure 4:
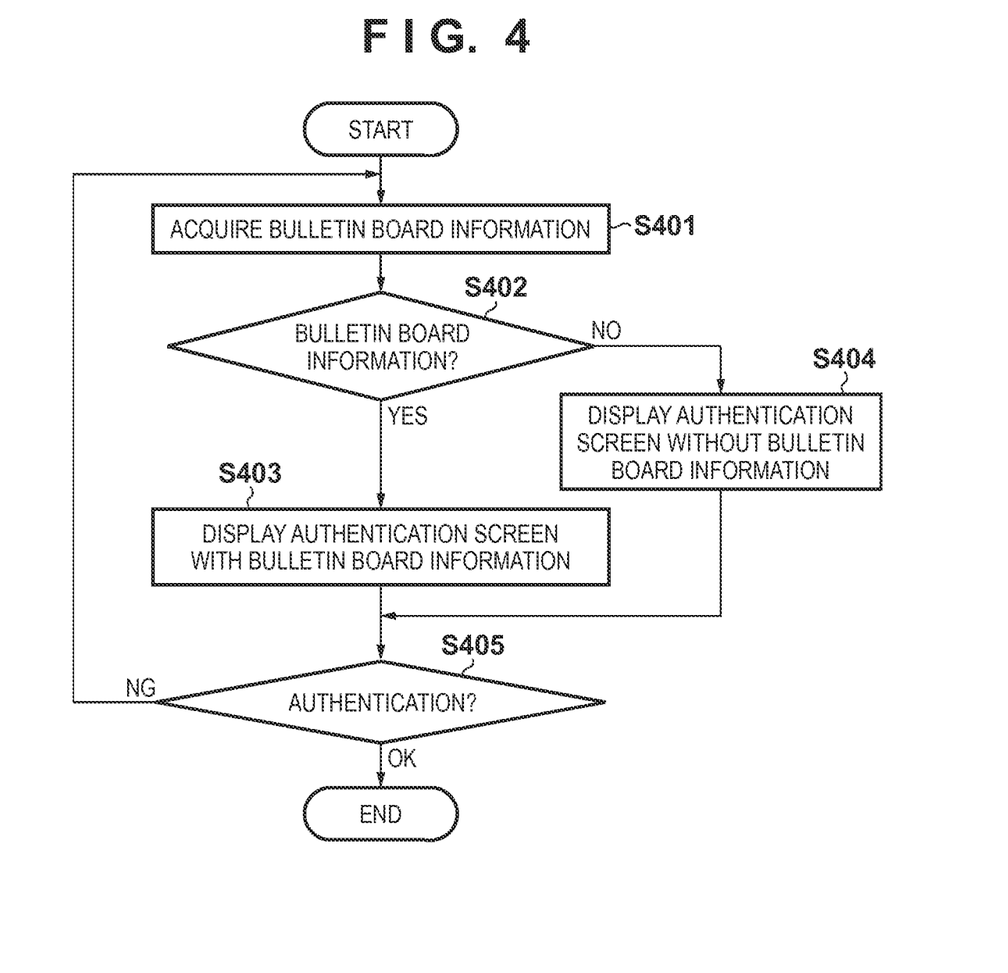
FIG. 4 is a flowchart showing the processing procedure of the image processing apparatus according to the first embodiment.

The processing procedure of the image processing apparatus 101 according to this embodiment will be described next with reference to FIG. 4. More specifically, a processing procedure to be executed when the user performs authentication using an IC card to use the image processing apparatus 101 will be explained. The processing to be described below is implemented by causing the CPU 210 to read out a control program from the HDD 209 to the RAM 212 and execute it. Note that in this embodiment, message information ("this copying machine is scheduled to be unusable from 15:00 today due to an inspection") to be displayed on the bulletin board is assumed to have already been registered in the bulletin board control unit 302 by the PC 102 via the communication unit 301 and the interface unit 206.

In step S401, the authentication processing unit 303 acquires the message information from the bulletin board control unit 302. In step S402, the authentication processing unit 303 determines whether or not message information to be presented to the user is acquired as the message information acquired in step S401. If the message information is acquired, the process advances to step S403. Otherwise, the process advances to step S404.

In step S403, the authentication processing unit 303 displays a waiting screen 501 created by adding the message information acquired from the bulletin board control unit 302 to a waiting screen (authentication screen) held in advance, and advances to step S405. On the other hand, upon determining that no appropriate message information is obtained from the bulletin board control unit 302, the authentication processing unit 303 displays the authentication screen held in advance in step S404, and advances to step S405. Note that steps S403 and S404 are steps of causing the authentication processing unit 303 to wait for input of authentication information. More specifically, the authentication processing unit 303 waits for the timing at which the user holds an IC card over the IC card reader (not shown) connected to the USB I/F 213.

In step S405, the authentication processing unit 303 executes authentication processing using the authentication information input via the IC card reader. More specifically, the authentication processing unit 303 compares the authentication information of the IC card input in step S403 or S404 with authentication information stored in the HDD 209 in advance, and determines whether or not the user is authentic. As a result, if the authentication has succeeded, the processing ends. If the authentication has failed, the process returns to step S401 to display the waiting screen for authentication again.

As described above, in this embodiment, message information display by the bulletin board function at the time of authentication processing by an authentication application using an IC card has been described. However, the present invention is not limited to this embodiment, and any other authentication application can also be applied. For example, when the acquired API of bulletin board information is opened to the public, even an authentication application of a different authentication method can cooperate with the bulletin board function.

<Screen Transition>

Figure 5A:
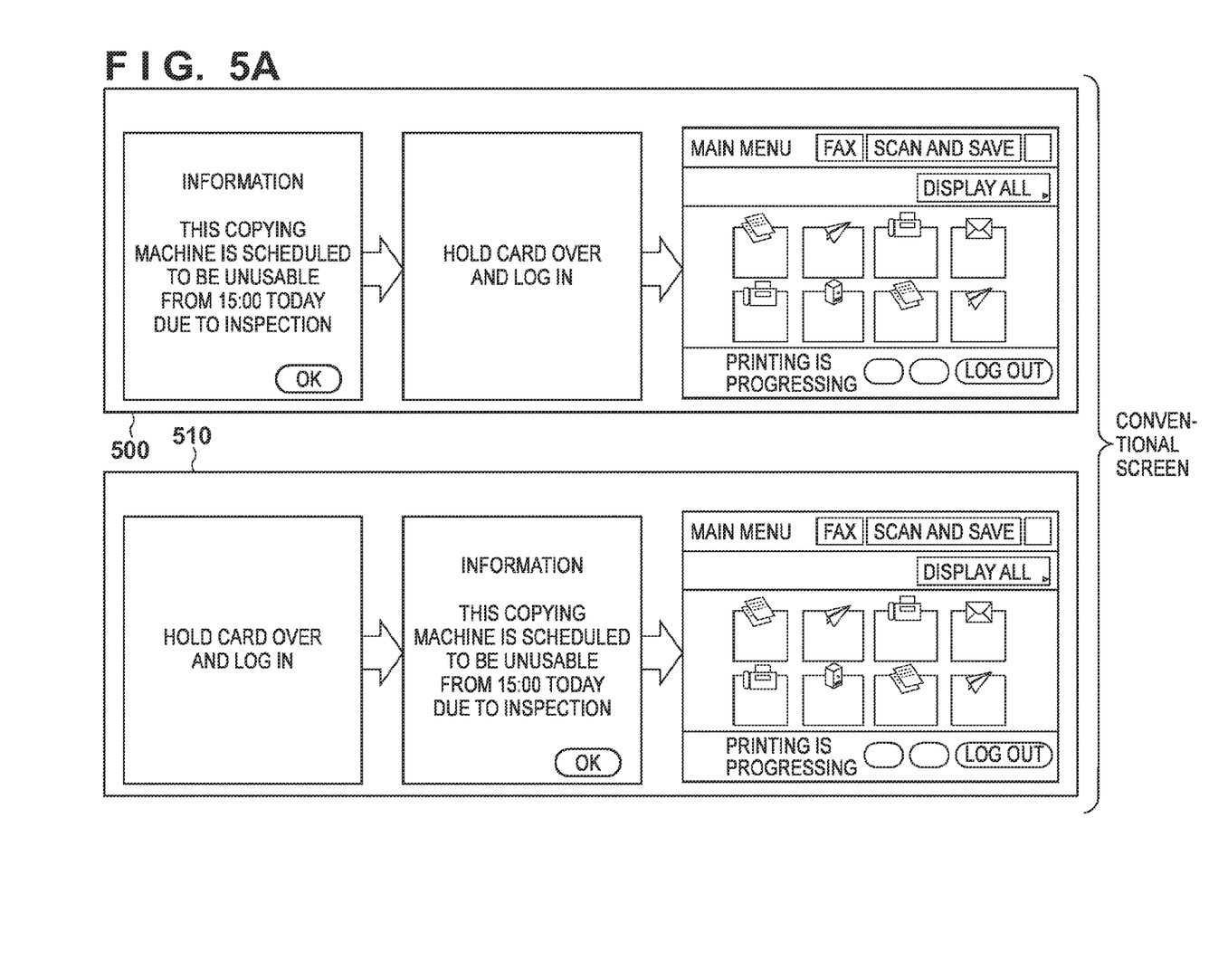
FIGS. 5A and 5B are screen transition diagrams when the flowchart of FIG. 4 according to the first embodiment is executed.
Figure 5B:
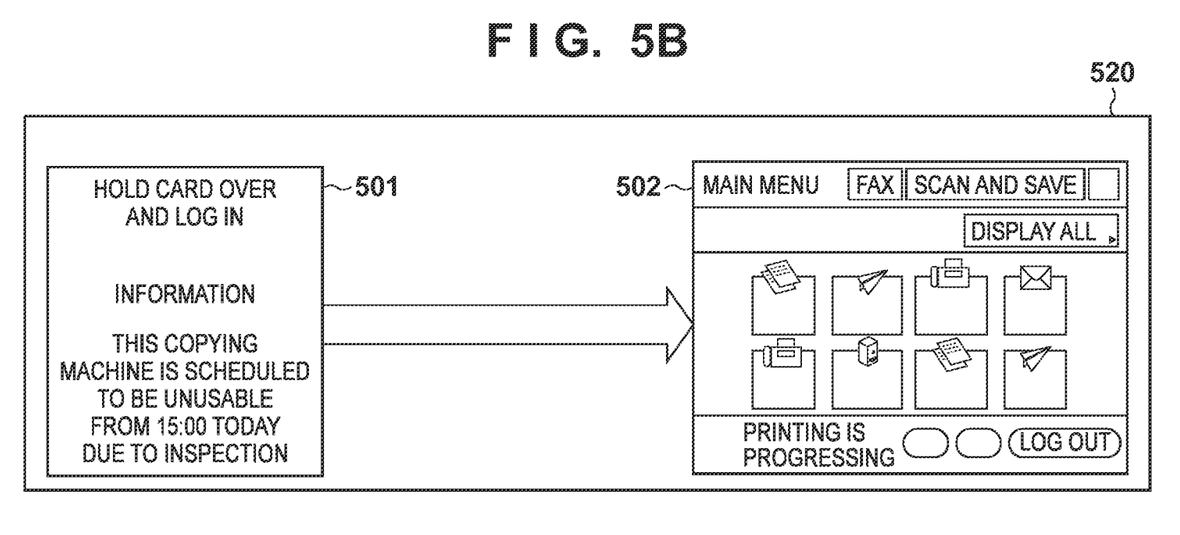

The screen transition on the operation panel of the operation unit 202 in the flowchart of FIG. 4 will be described next with reference to FIGS. 5A and 5B. In FIGS. 5A and 5B, 500 and 510 indicate screen transitions of comparative examples without conformance to the embodiment, and 520 indicates a screen transition that occurs when the flowchart of FIG. 4 according to the embodiment is executed. In the screen transition 500, the message by the bulletin board function is displayed. When the OK button is pressed, the screen transits to the authentication screen. When the authentication has succeeded, the screen transits to the basic screen of the image processing apparatus. In the screen transition 510, the authentication screen is displayed first. When the authentication has succeeded, the message by the bulletin board function is displayed. When the OK button is pressed, the screen transits to the basic screen of the image processing apparatus. In the screen transitions 500 and 510 of the comparative examples, however, the user needs to perform the operation of pressing the OK button on the display screen of the message by the bulletin board function. This leads to reduced operability.

The image processing apparatus 101 according to this embodiment adds the message by the bulletin board function to the authentication screen. The screen 501 is the authentication screen created by adding the message information of the bulletin board control unit 302 to the screen of the authentication processing unit 303 in step S403. When the user confirms the authentication screen and holds the IC card over the IC card reader, authentication processing is executed, and the screen transits to a basic screen 502 of the image processing apparatus 101. If the message is long and cannot wholly be displayed at once in the screen 501 because of the limited space in the display area of the authentication screen, the message may be scrolled to catch the user's eye. A plurality of periodical contact messages may be registered as message information to be displayed, and a day of the week or time may be designated to switch the display automatically. The bulletin board control unit 302 may hold the message information together with importance information representing the importance. In this case, the authentication processing unit 303 may switch the display method based on the importance information. For example, the message may be displayed in a different color or font.

<Second Embodiment>

Figure 6:
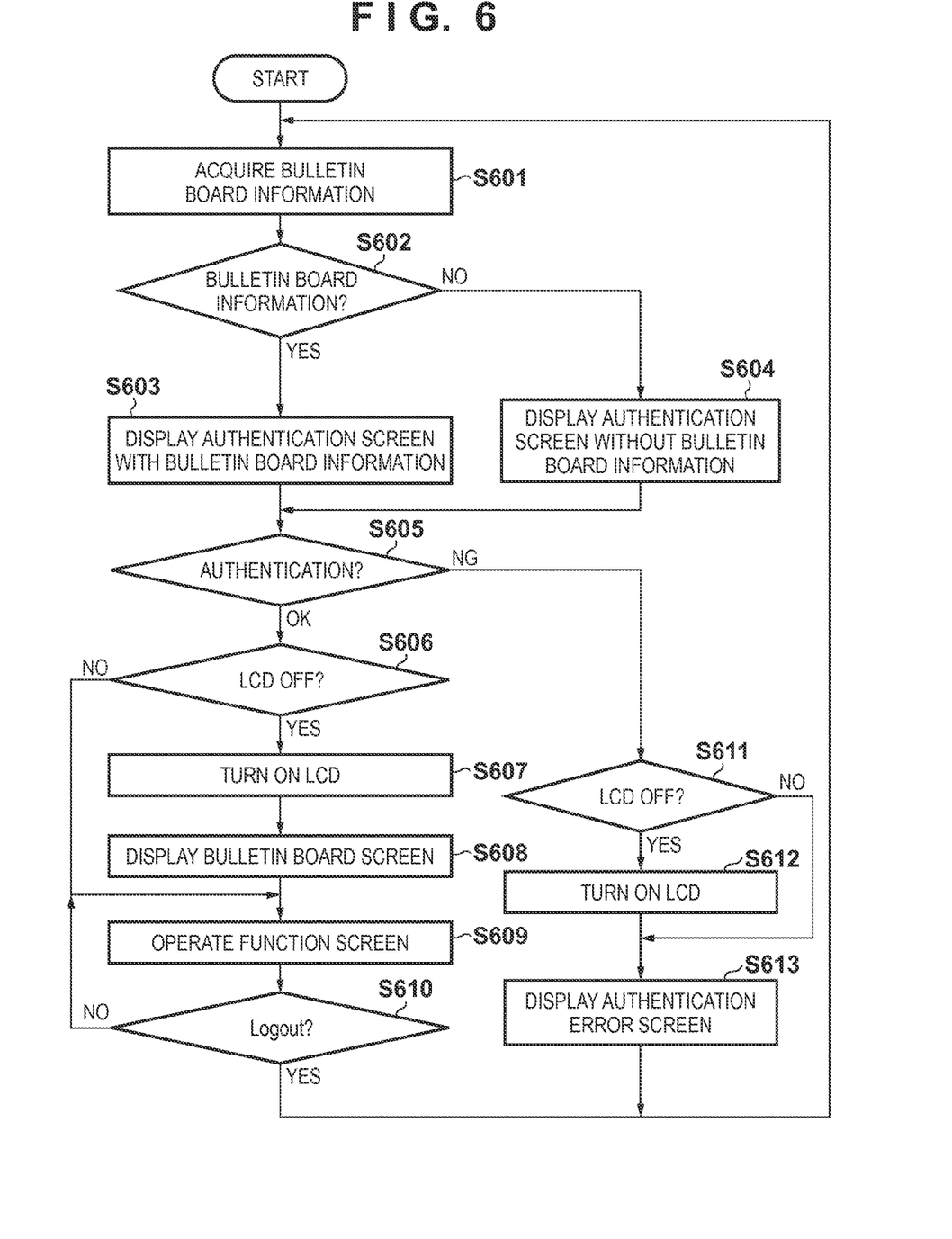
FIG. 6 is a flowchart showing the processing procedure of an image processing apparatus according to the second embodiment.
Figure 7:
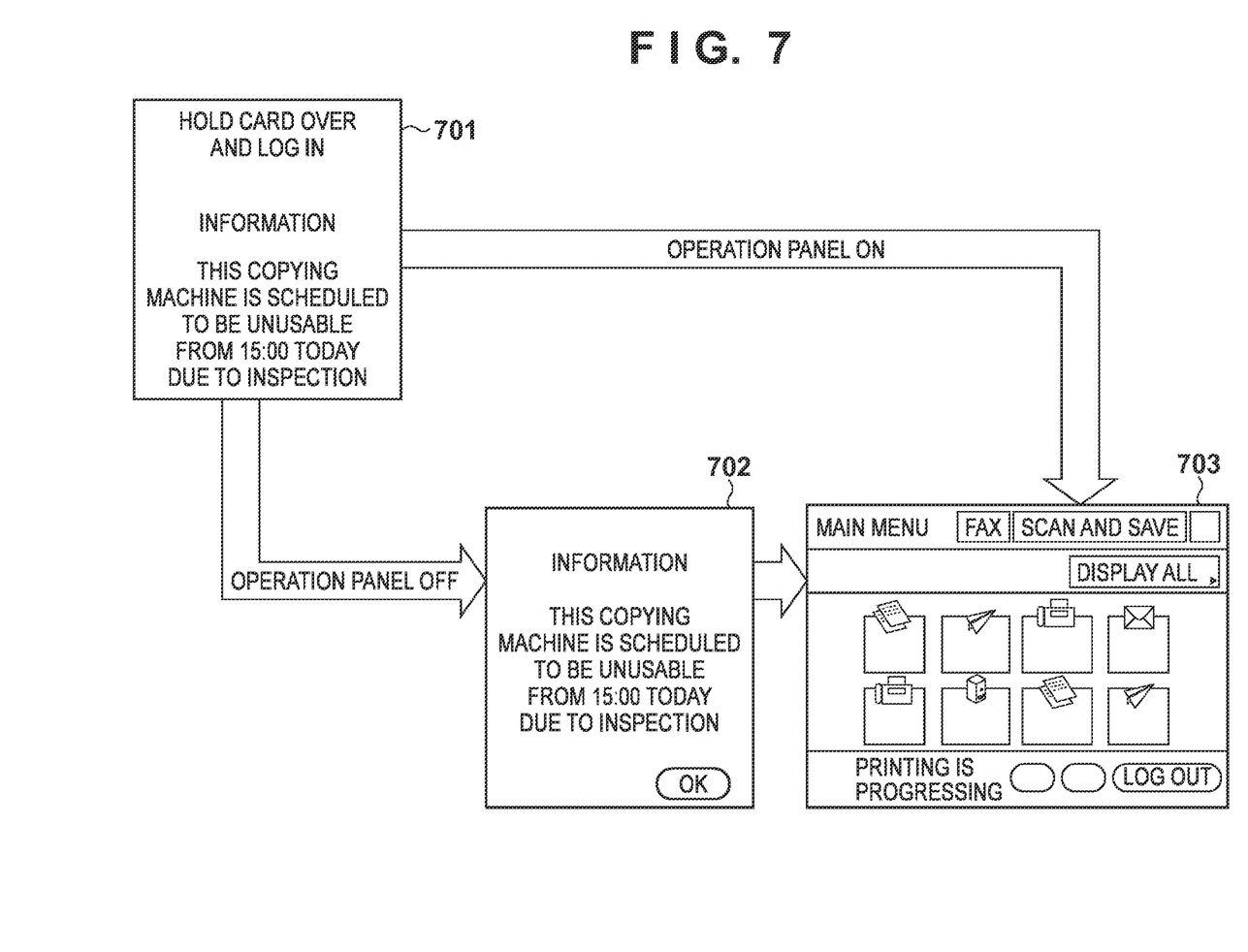
FIG. 7 is a screen transition diagram when the flowchart of FIG. 6 according to the second embodiment is executed.

The second embodiment will be described below with reference to FIGS. 6 and 7. In this embodiment, an authentication operation when turning off the operation panel by a power saving function generally held by an image processing apparatus 101 will be explained. Note that only the arrangements and techniques which differ from the above embodiment will be described below.

The processing procedure of the image processing apparatus 101 according to this embodiment will be described first with reference to FIG. 6. More specifically, a processing procedure to be executed when the user performs authentication using an IC card to use the image processing apparatus 101 having a power saving mode will be explained. The processing to be described below is implemented by causing a CPU 210 to read out a control program from an HDD 209 to a RAM 212 and execute it. Note that steps S601 to S604 are the same as steps S401 to S404 of the first embodiment, and a description thereof will be omitted. In this embodiment, however, when the apparatus is waiting for input of authentication information in step S403 or S404, the operation panel may be turned off under the control of a power saving control unit 304.

In step S605, an authentication processing unit 303 performs authentication processing, as in step S405. If the authentication has succeeded, the process advances to step S606. If the authentication has failed, the process advances to step S611. In step S606, the authentication processing unit 303 determines whether or not the operation panel is off. More specifically, the authentication processing unit 303 calls a predetermined I/F of the power saving control unit 304 and confirms the on state. If the operation panel is off, the process advances to step S607. If the operation panel is on, the process advances to step S609.

In step S607, the authentication processing unit 303 calls a predetermined I/F of the power saving control unit 304 to instruct it to turn on the operation panel, and advances to step S608. In step S608, the authentication processing unit 303 instructs a bulletin board control unit 302 to display a bulletin board screen 702, and waits for input of the OK button representing user's confirmation. Note that the authentication processing unit 303 itself may be configured to display the bulletin board screen in step S608. When the OK button is pressed, the process advances to step S609.

In step S609, the CPU 210 displays, on the operation panel, a basic screen 703 to operate a function such as a copy function. In step S610, the authentication processing unit 303 determines whether or not a logout operation has been performed. If logout has been done, the process returns to step S601 to repeat the above-described processing. Otherwise, the process returns to step S609 to continue the operation of the image processing apparatus 101.

If the authentication has failed in step S605, the authentication processing unit 303 determines in step S611 whether or not the operation panel is off, as in step S606. If the operation panel is off, the process advances to step S612 to turn on the operation panel and then advances to step S613. If the operation panel is on, the process directly advances to step S613. In step S613, the authentication processing unit 303 displays an error screen to notify the operator of the authentication failure. The process then returns to step S601 to repeat the above-described processing.

The screen transition on the operation panel of an operation unit 202 in the flowchart of FIG. 6 will be described next with reference to FIG. 7. A screen 701 is the same authentication screen as the screen 501 shown in FIGS. 5A and 5B, and includes the added message by the bulletin board function. The screen 702 is the bulletin board information display screen displayed in step S608. If the user holds the IC card over the IC card reader in the off state of the operation panel, the screen 702 is displayed after authentication. After that, the screen 703 that is the basic screen of the normal operation of the image processing apparatus 101 is displayed. If the user holds the IC card over the IC card reader in the On state of the operation panel, the screen 703, rather than the screen 702, is directly displayed.

<Third Embodiment>

Figure 8:
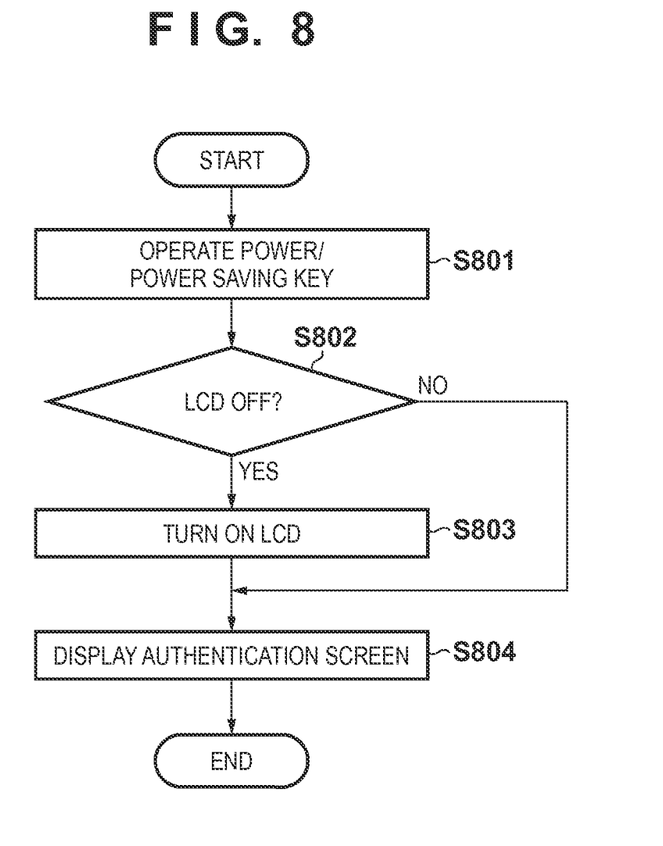
FIG. 8 is a flowchart when an operation panel is used for an authentication operation according to the third embodiment.

The third embodiment will be described next with reference to FIG. 8. In this embodiment, a processing procedure which is executed when the operation panel of an operation unit 202, rather than an IC card, is used in steps S403, S404, S603 or S604 of the first or second embodiment will be explained. The processing to be described below is implemented by causing a CPU 210 to read out a control program from an HDD 209 to a RAM 212 and execute it.

In step S801, the operation unit 202 detects that the user has operated a power switch or power saving switch (predetermined key) installed in the operation unit 202 to operate an image processing apparatus 101. In step S802, the operation unit 202 determines whether or not the operation panel is off. More specifically, the operation unit 202 calls a predetermined I/F of a power saving control unit 304 and confirms the On state. If the operation panel is off, the process advances to step S803. If the operation panel is not off, the process advances to step S804.

In step S803, the operation unit 202 calls a predetermined I/F of the power saving control unit 304 to instruct it to turn on the panel of the operation unit 202. On the other hand, in step S804, an authentication processing unit 303 displays an authentication screen, as in step S403, S404, S603, or S604. In this embodiment, the user inputs a user ID or password on the authentication screen displayed in step S804. The message by the bulletin board function is added and displayed in the authentication screen. Hence, in this embodiment, the operation panel is always on when the authentication screen is displayed, and the user confirms the message by the bulletin board function.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, a computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-185254 filed on Aug. 26, 2011, which is hereby incorporated by reference herein in its entirety.

What is claimed is:

1. An image processing apparatus comprising:
a display unit;
a storage unit that stores message information received from an external apparatus;
an authentication unit that executes an authentication processing of a user who uses the image processing apparatus;
an acquisition unit that acquires the message information from the storage unit;
a display control unit that displays, on the display unit, an authentication screen to execute the authentication processing; and
a determination unit that determines whether or not the display unit is turned off when the authentication processing is executed by the authentication unit,
wherein, when the message information is acquired by the acquisition unit, the display control unit adds the message information to the authentication screen, and displays, on the display unit, the authentication screen to which the message information is added, and
wherein, when the authentication processing is executed by the authentication unit and the determination unit has determined that the display unit is turned off, the display control unit (a) turns on the display unit, (b) displays, on the display unit, the message information acquired by the acquisition unit, and (c) displays an operation screen of the image processing apparatus afterwards, and
wherein, when authentication processing is executed by the authentication unit and the determination unit has determined that the display unit is not turned off, the display control unit displays, on the display unit, the operation screen of the image processing apparatus.

2. The apparatus according to claim 1, further comprising a power saving control unit that turns off the display unit in a power saving mode.

3. The apparatus according to claim 2, further comprising an operation unit that receives input by a user operation,
wherein, when the operation unit has received input of a predetermined key pressed by the user, the power saving control unit turns on the display unit in an off state.

4. The apparatus according to claim 1, wherein, if the message information cannot be displayed at once in a display area where the message information is displayed in the authentication screen, the display control unit scrolls the message information.

5. The apparatus according to claim 1, wherein the storage unit stores a periodical contact message as the message information.

6. The apparatus according to claim 1, wherein the storage unit stores importance information representing importance of the message information together with the message information, and
wherein the display control unit changes a display method of the message information based on the importance information.

7. A method of controlling an image processing apparatus including (i) a storage unit that stores message information received from an external apparatus, and (ii) an authentication unit that executes authentication processing of a user who uses the image processing apparatus, the method comprising:
acquiring the message information from the storage unit;
displaying, on a display unit, an authentication screen to execute the authentication processing;
determining whether or not the display unit is turned off when the authentication processing is executed by the authentication unit;
when the authentication processing is executed and it has been determined in the determining step that the display unit is turned off, (a) turning on the display unit, (b) displaying the message information acquired in the acquiring step, and (c) displaying an operation screen of the image processing apparatus afterwards; and
when authentication processing is executed and it has been determined in the determining step that the display unit is not turned off, displaying, on the display unit, the operation screen of the image processing apparatus,
wherein, when the message information is acquired in the acquiring step, the message information is added to the authentication screen, and the authentication screen to which the message information is added is displayed on the display unit .

8. A non-transitory computer-readable storage medium storing a computer program that causes a computer to execute each step of a method of controlling an image processing apparatus of claim 7.

* * * * *